United States Patent [19]
Dokas

[11] Patent Number: 6,000,764
[45] Date of Patent: Dec. 14, 1999

[54] HYDRAULIC PUMP ASSEMBLY AND METHOD OF MAKING SAME

[75] Inventor: David M. Dokas, Redford, Mich.

[73] Assignee: Kelsey Hayes Company, Livonia, Mich.

[21] Appl. No.: 08/999,368

[22] Filed: Dec. 29, 1997

Related U.S. Application Data

[60] Provisional application No. 60/034,388, Dec. 30, 1996.

[51] Int. Cl.$^6$ .............................. B60T 8/40; F04B 19/00; F16L 55/18; F16K 15/00
[52] U.S. Cl. ...................... 303/116.4; 417/470; 137/539; 137/315; 137/15
[58] Field of Search .................................. 303/116.4, 10, 303/11; 417/470, 549, 547; 137/539, 315, 15

[56] References Cited

U.S. PATENT DOCUMENTS

| | | | |
|---|---|---|---|
| 4,405,316 | 9/1983 | Mittleman | 604/86 |
| 4,526,516 | 7/1985 | Swain et al. | 417/222 |
| 4,838,620 | 6/1989 | Sypniewski | 303/116 |
| 4,875,741 | 10/1989 | Ozawa et al. | 303/116 |
| 5,057,278 | 10/1991 | Maxwell et al. | 422/81 |
| 5,171,029 | 12/1992 | Maxwell et al. | 277/212 R |
| 5,213,482 | 5/1993 | Reinartz et al. | 417/273 |
| 5,232,273 | 8/1993 | Eckstein et al. | 303/116.4 |
| 5,335,984 | 8/1994 | Alaze et al. | 303/119.2 |
| 5,588,817 | 12/1996 | Zirps et al. | 417/549 |
| 5,601,345 | 2/1997 | Tackett | 303/116.4 |
| 5,628,625 | 5/1997 | Dokas | 417/523 |
| 5,716,111 | 2/1998 | Schenk et al. | 303/116.4 |
| 5,722,738 | 3/1998 | Beck et al. | 303/116.4 |

FOREIGN PATENT DOCUMENTS 92 02864   12/1992   WIPO .

*Primary Examiner*—Chris Schwartz
*Assistant Examiner*—Jeffrey Woller
*Attorney, Agent, or Firm*—Macmillan, Sobanski & Todd, LLC; A. Michael Tucker

[57] ABSTRACT

A vehicle braking system including an antilock braking system or a traction assist braking system, or both, operatively coupled therewith, is disclosed. The system includes a pump assembly including a housing defining a main bore, an inlet bore, and an outlet bore. A reciprocatable piston is retained in the main bore. An inlet check valve is operable to pass fluid to the outlet bore when the piston reciprocates. An outlet check valve is inserted into the outlet bore and operates to pass fluid from the pump assembly when the piston reciprocates. A deformable flange extends sufficiently outward from a valve body of the outlet check valve. The flange secures the outlet check valve within the outlet bore when the flange is deformed into displacing engagement with the outlet bore. Further, a method of securing a valve in a bore of a pump assembly is disclosed.

25 Claims, 2 Drawing Sheets

6,000,764

HYDRAULIC PUMP ASSEMBLY AND METHOD OF MAKING SAME

CROSS-REFERENCE TO RELATED APPLICATION

This application claims the benefit of United States provisional patent application identified as application Ser. No. 60/034,388, filed Dec. 30, 1996.

BACKGROUND OF THE INVENTION

This invention relates to high speed, high pressure hydraulic pumping units, particularly opposed piston-type pumps for use in vehicular antilock brake systems (ABS) including those having integrated traction assist (TA) features, i.e., ABS/TA pumps, and the construction and placement of the check valves controlling fluid flow to and from the pump per se.

In any conventional ABS/TA system in use on vehicles today, there is generally provided an electric motor-driven opposed piston-type pumping unit for supplying pressurized brake fluid to any one of the brakes on instant, automatically controlled demand. The electrically-driven motor is a part of the ABS/TA unit and includes a drive shaft which will include one or more cam lobes. Transversely disposed of the drive shaft, generally at 180° from one another, are a pair of pumping pistons within a respective pump body. The output of each pumping piston provides high pressure brake fluid, generally in the order of 2500 psi, to a respective segment of the braking system. In other words, in a conventional braking system for a four-wheel vehicle, the braking system is divided into two separate braking segments beginning at a dual-chambered master cylinder. Each segment provides the braking force to a predetermined pair of wheels. One segment may be to the left front-right rear wheels, for example, while the other segment provides the braking power to the right front-left rear wheels. The ABS/TA system is typically integrated into the vehicular braking system in the same manner, thereby providing antilock braking characteristics from each of the pair of pumping units to a respective one of the braking system segments. Likewise, traction assist capabilities are commonly added to the ABS/TA system in such a manner as to use the pump output for applying brake pressure to any one or more of the wheels to preclude wheel slip. This means increased use of the common pump, and added concern for the cost and performance attributes of the pump.

Due to the performance demanded of the ABS/TA unit, it is important that the pumping unit provide high pressure brake fluid to the system as efficiently and quickly as possible.

Further, it is important that the pumping unit be efficiently and effectively manufactured to meet applicable quality control and performance standards.

SUMMARY OF THE INVENTION

It is, therefore, an object of the present invention to provide an improved vehicle braking system, including an antilock braking system or a traction assist braking system, or both, operatively coupled therewith.

It is a further object of the present invention to provide an improved ABS/TA system in which the pumping unit is efficiently and effectively manufactured.

In carrying out the above objects and other objects and features of the present invention, a vehicle braking system is provided. The system includes a pump assembly and a motor for driving the pump assembly. The motor has an output drive shaft having a cam for continuously engaging the pump assembly. The pump assembly is driven by the cam as demanded by the ABS/TA system. The pump assembly includes a housing defining a main bore. The housing further defines an inlet bore and an outlet bore; the inlet bore and the outlet bore are in fluid flow communication with the main bore. A reciprocatable piston is retained in the main bore. An inlet check valve is in fluid flow communication with the inlet bore and operable to pass fluid to the outlet bore when the piston reciprocates. An outlet check valve is insertable into the outlet bore and operable to pass fluid from the pump assembly when the piston reciprocates.

The outlet check valve includes an interference portion operable to deform the housing in a boundary of the outlet bore when fully installed into the outlet bore. The interference portion retains the outlet check valve in locking engagement with the outlet bore.

In a preferred construction, the outlet check valve includes a valve body having a fluid outlet passageway therethrough for accommodating fluid flow. The outlet check valve further includes a deformable flange extending sufficiently outwardly from the valve body for securing the outlet check valve within the outlet bore. The flange is deformed into displacing engagement with the outlet bore to thereby secure the outlet check valve within the outlet bore.

Further, in a preferred construction, the valve body includes a flange support portion having a flange support member extending outwardly therefrom; the flange extends outwardly from the flange support portion. An annular relief channel is defined between the flange and the flange support member. An end of the valve body has a chamfered step seat that is positioned into substantially supporting engagement with a step defined by the outlet bore, and supports the outlet check valve during deformation of the flange. During deformation, the flange displaces into the annular relief channel and into displacing engagement with the outlet bore boundary walls. Preferably, the outlet bore is substantially perpendicular to the main bore.

Further, a method of securing a valve in a pump assembly for pumping fluid in a vehicular fluid control system is provided. The pump assembly includes a housing defining a bore, the bore defines a step therein. The valve includes a valve body, and the method includes the steps of: inserting the valve body into the bore, positioning the valve against the step, and deforming the flange into displacing engagement with the bore.

The advantages accruing to the present invention are numerous. For example, reducing the number of valve components by utilizing a valve body and flange arrangement, wherein the valve body and the flange are formed integrally, increases manufacturing efficiency and effectiveness. Relocating the outlet check valve to a position transverse of the pump piston and sleeve cartridge also simplifies construction and allows downsizing the hydraulic control unit overall.

The above objects and other objects, features and advantages of the present invention will be readily appreciated by one of ordinary skill in the art from the following detailed description of the best mode for carrying out the invention when taken in connection with the accompanying drawings.

DETAILED DESCRIPTION OF THE PREFERRED EMBODIMENTS

Figure 1:
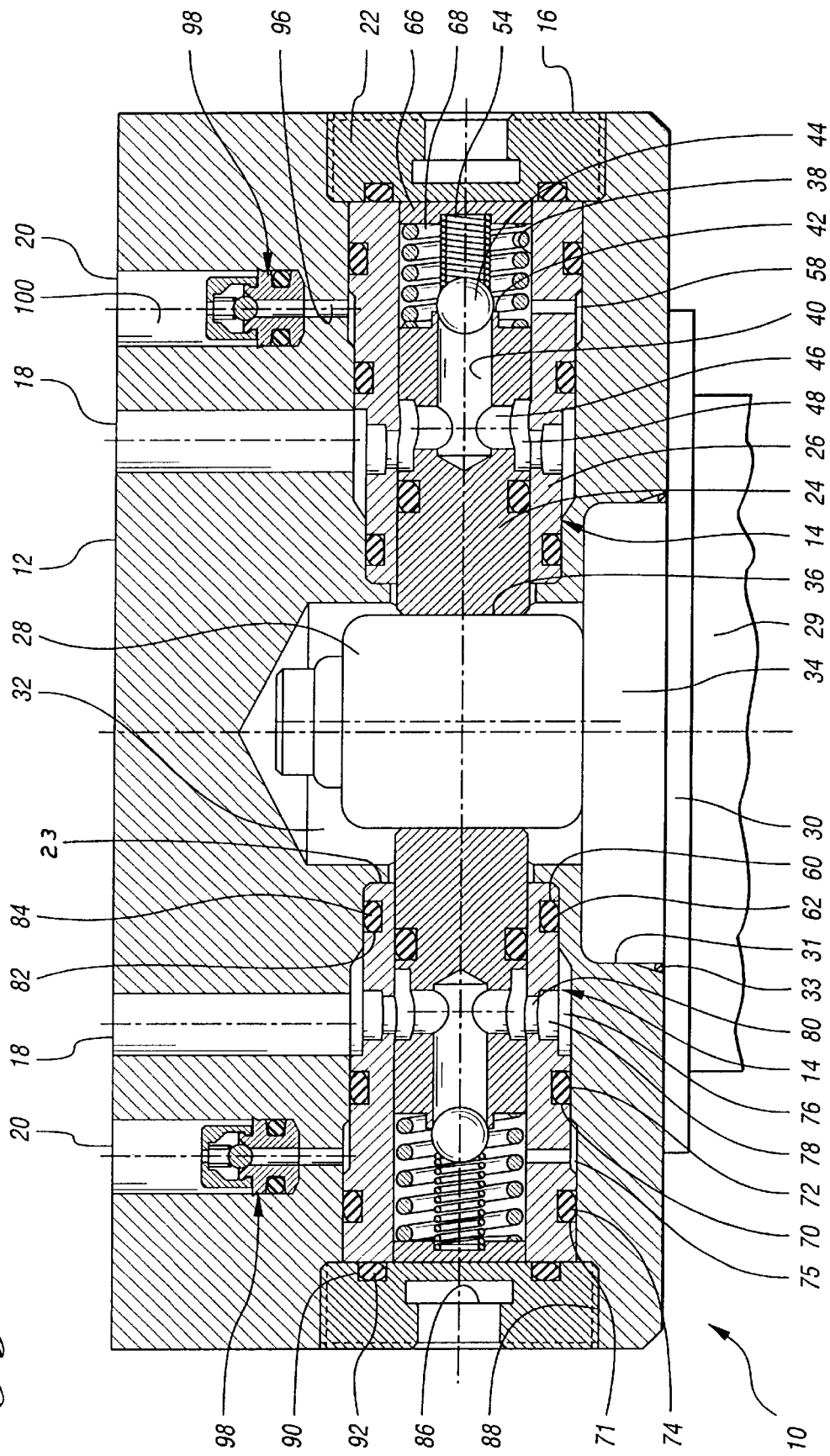
FIG. 1 is a plan view showing in cross-section an enlarged view of the ABS/TA control unit housing including a full cross-sectional view of a pump assembly made in accordance with the present invention.

Referring now to FIG. 1, there is illustrated a particular construction of a reciprocating dual-piston type pump assembly, generally designated at 10, of the present invention. Pump assembly 10 has a housing 12, a single pumping unit or pump piston and sleeve assembly is generally designated at 14. Single pumping unit 14 is concentrically received within a main bore 16 defined by the control module or housing 12. Housing 12 defines an inlet bore 18 and an outlet bore 20, both bores are in fluid flow communication with main bore 16. Outlet bore 20 is substantially perpendicular to main bore 16. Pump 14 is held axially in place within the housing 12 by means of a plug element 22 which is threadedly secured to housing 12 and bears against an end of pump 14, forcing it to seat the sleeve upon a shoulder 23 within the main bore 16. To facilitate an understanding of the present invention, both single pumping units 14 of dual-piston type pumping unit 10 are shown to be identical. It should be appreciated that, unlike the construction shown in FIG. 1, the single pumping units do not need to be identical.

Pump unit 14 includes a piston 24 concentrically received in sliding engagement with the single diameter through bore concentrically located within annular sleeve 26. The through bore design allows a practical, relatively inexpensive technique of providing the best possible consistent surface finish on the through bore. The piston 24 includes a drive section at one end operating off of a cam bearing surface 28 of the drive shaft of an electric motor 29. The motor 29 is bolted at flange 30 to the housing 12. Pump unit 14 has a pump section at its other end The electric motor 29 and the drive shaft extend through a counterbored cavity 31 defining with the housing 12 a motor bearing cavity 32. An O-ring 33 seals motor bearing cavity 32.

With continuing reference to FIG. 1, a piston head 36 is provided at the drive section of piston 24. Piston head 36 rides on cam 28, which can be a separate roller-supported cam member eccentrically and rotationally mounted on the motor drive shaft as shown or can simply be a cammed surface of the drive shaft. Sleeve 26 has a bore defining a pump chamber 38 of pump unit 10. The pump end of piston 24 has a bore defining a fluid inlet passageway 40. Inlet passageway 40 provides a seat 42 upon which is seated a ball valve 44, described below, to provide an inlet check valve. In open communication with the fluid inlet passageway 40 is a transversely oriented fluid inlet 46 which is in open fluid communication with an annular chamber defined by an annular groove 48 about the circumference of piston 24. The axial length of the annular groove 48 is such that it will always provide fluid communication through the sleeve 26 with the inlet bore 18.

The dual pumping unit 10, other than the sleeve 26 and piston 24, which are preferably 1215 carbonized steel and springs which are also steel, is preferably aluminum or other light weight alloy. A coil-type ball valve return compression spring 54 lightly maintains the ball 44 on seat 42 under a negligible force. Sleeve 26 includes a pump chamber outlet port 58 to provide fluid communication between pumping chamber 38 and outlet bore 20. Sleeve 26 is received within a least diameter section of the housing main bore 16. This section includes an annular O-ring groove 60 for receiving an O-ring 62 to seal an end of the sleeve 26, near the pilot end of piston 24, from the low pressure brake fluid coming through inlet bore 18 to the pump. The other end of the sleeve 26 receives a spring seat 66 upon which a coil-type compression spring 68 is concentrically captured between plug element 22 and piston 24. Further, inlet check valve spring 54 is captured between plug element 22 and piston 24. At this end of sleeve 26, there is provided a pair of grooves 70 and 71 receiving O-rings 72 and 74, respectively, sealing high pressure brake fluid passing through outlet bore 20 from the remainder of pump unit 14. An annular fluid chamber 75 is provided between housing 12 and sleeve 26 near outlet bore 20 as defined by a section of main bore 16. Another annular fluid chamber 76 is provided near inlet bore 18 as defined by a section of main bore 16. Alteratively, spring seat 66 can be an integral part of plug element 22.

With continuing reference to FIG. 1, sleeve 26 has an annular groove 78 and further includes a low pressure inlet port 80 at its mid-section communicating with fluid inlet passageway 40, and transverse fluid inlet 46, as previously described. Piston 24 has an annular groove 82 which receives an ring 84 which acts as a seal between piston 24 and sleeve 26 at the drive section of piston 24. At the pump end of the sleeve, plug element 22 is shown at 88 to be threadedly secured to housing 12. Other securement methods such as lock rings or swaging are also acceptable. In either case, it will be noted that plug element 22 directly abuts sleeve 26 for controlling compression of O-ring 92, and the sleeve directly abuts housing 12 at its other end at shoulder 23 of considerable depth and resultant strength. Installation torque or force is thereby far less a manufacturing factor than with current designs. Plug element 22 has a groove 90 and receives an O-ring 92 which acts as a seal between sleeve 26 and plug element 22. An intermediate passageway 96 of minimal length provides fluid flow communication to an outlet check valve, generally designated 98, through outlet port 58. The outlet check valve 98 controls fluid flow between intermediate passageway 96 and housing outlet passageway 100.

Figure 2:
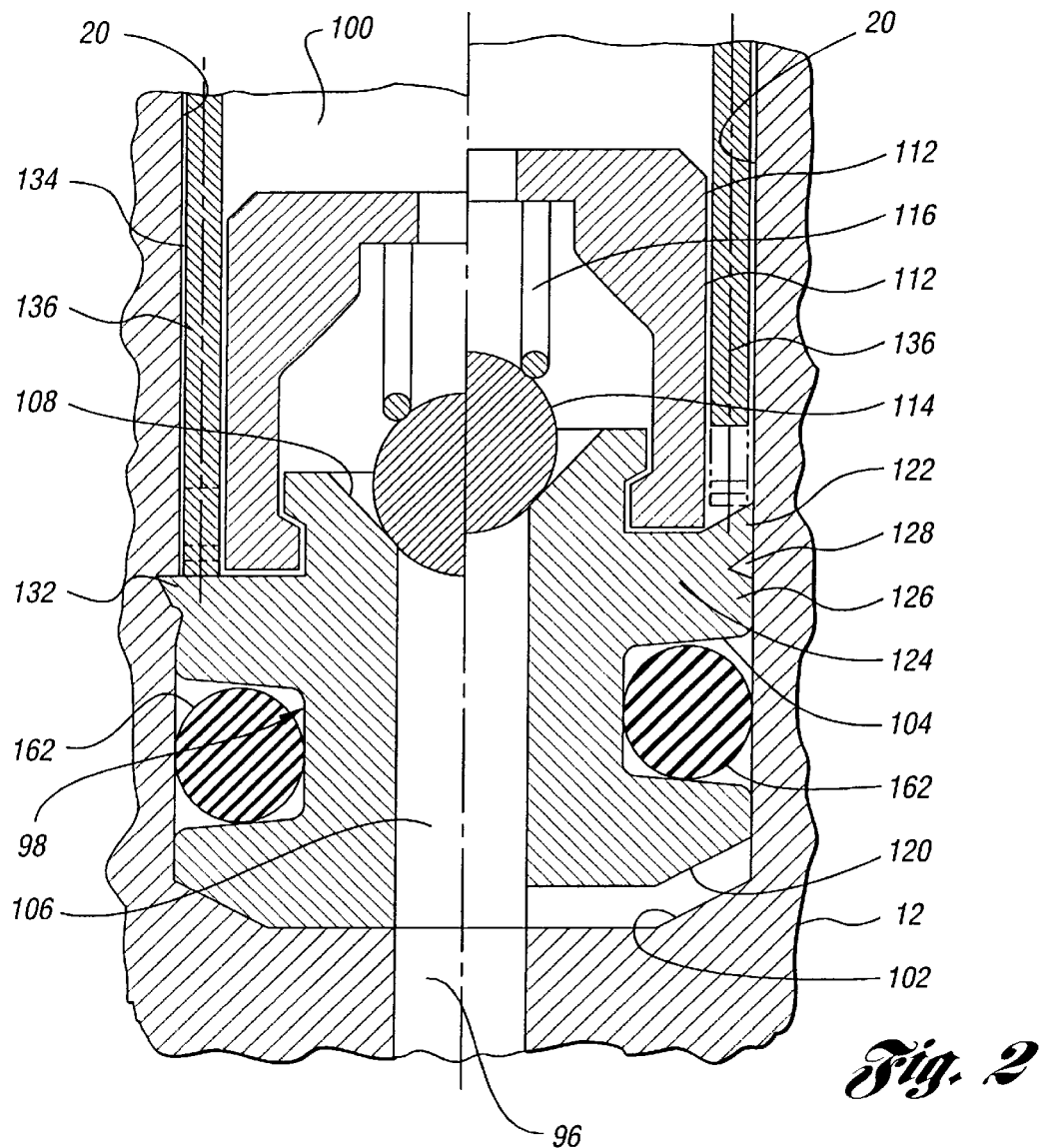
FIG. 2 is an enlarged cross-sectional view of an outlet check valve of the pump assembly shown in FIG. 1, the left-hand side showing the outlet check valve after completion of installation, and the right-hand side showing the outlet check valve prior to completion of installation.

Referring now to FIG. 2, an enlarged cross-sectional view of outlet check valve 98 is shown. The left-hand side of FIG. 2 shows the outlet check valve after completion of installation, and the right-hand side shows the outlet check valve prior to completion of installation. Outlet bore 20 defines a step 102 between housing outlet passageway 100 and intermediate passageway 96.

The outlet check valve 98 includes a valve body 104. Valve body 104 is insertable into outlet bore 20 and has a fluid passageway 106 therethrough for accommodating fluid flow. A valve seat 108 is located along fluid passageway 106. A flexible plastic spring retainer 112 is coupled to valve body 104, and a ball 114 is located between spring retainer 112 and valve seat 108. Spring retainer 112 is formed of molded plastic, and snap-fits over a portion of valve body 104. The ball 114 controls fluid flow through fluid passageway 106. A spring 116 biases ball 114 into engagement with valve seat 108. Valve body 104 includes a chamfered step seat 120 at an end of valve body 104; step 102 supports chamfered step seat 120.

Valve body 104 has an interference portion operable to deform the housing 12 in outlet bore 20 when the valve is secured within outlet bore 20 during the installation sequence as described below. Valve 98 is then substantially retained in locking engagement with the outlet bore 20. An O-ring 162 maintains a seal between the outlet valve body 104 and the outlet bore 20.

With reference to the embodiment depicted in FIG. 2, the interference portion is a deformable flange 122 extending sufficiently outwardly from a flange support portion 124 of valve body 104. Flange support portion 124 includes a flange support member 126. A gap volume such as annular relief channel 128 is defined between flange 122 and flange support member 126. Flange 122 displaces into gap volume 128 when deformed. A deformed flange 132 is shown in the left-hand side of FIG. 2. The deformed flange 132 is radially expanded into the housing at the boundary of outlet bore 20. The right-hand side of FIG. 2 shows the flange 122 nondeformed.

Preferably, valve body 104 is formed of steel, as is ball 114, and spring 116. Ball 114 could also be formed of a ceramic material. Spring retainer 112 is formed of molded plastic.

Figure 3:
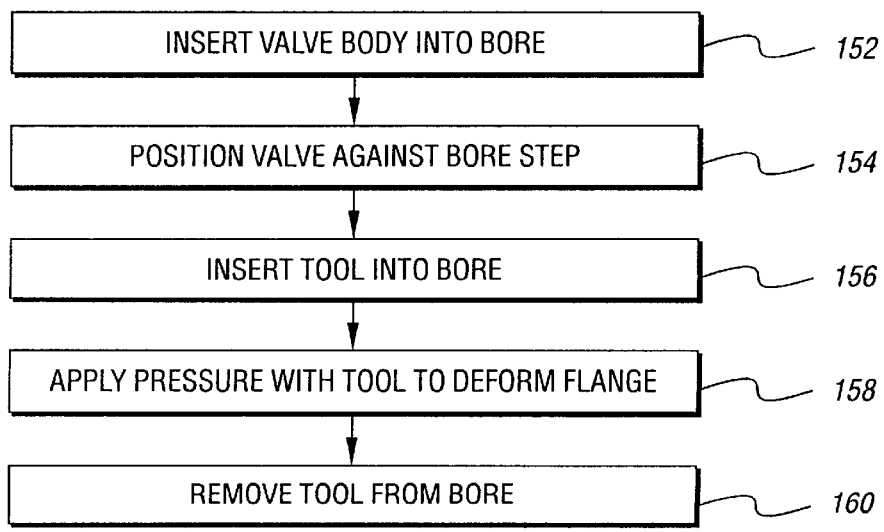
FIG. 3 is a block diagram illustrating a method of securing a valve within an outlet bore in accordance with the present invention.

With reference to FIGS. 2 and 3, a method of securing a valve in a pump assembly will now be described. It is to be appreciated that the method of the present invention can be employed to secure either an inlet or an outlet check valve, or both, in a housing bore of a pump assembly. In the illustrated embodiment, valve body 104 is inserted into outlet bore 20, as indicated by block 152. Flange 122 is received in sliding engagement with outlet bore 20 during insertion of valve body 104, as shown in the right-hand side of FIG. 2.

The valve 98 is positioned into substantially supporting engagement with step 102, with step seat 120 abutting step 102, as indicated by block 154. At block 156, an annular punch type tool 136 is inserted into outlet bore 20 into a tool receiving gap 134 between spring retainer 112 and housing 12. Tool 136 is shown having phantom lines indicative of tool motion during the installation process. An outermost portion of spring retainer 112 has a diameter less than the outlet bore diameter. The tool may slidably engage the outermost portion and/or the outlet bore therebetween. At block 158, sufficient pressure is applied by tool 136 to flange 122 to deform the flange 122 into displacing engagement with outlet bore 20. Flange 122 displaces the housing 12 into gap volume 128, preferably into all of gap volume 128 as shown in the left-hand side of FIG. 2, and itself is embedded within the housing 12, thereby securely locking the check valve 98 to the housing 12. The tool is then removed from the outlet bore 20 as indicated by block 160.

In operation, with reference to FIG. 2, the pump unit operates in a manner described earlier. Thus, when for example, wheel slip is sensed and the traction system is activated, low pressure fluid will be present at inlet bore 18, and the sleeve 26 and single pumping unit 14 will be generally filled. The pump unit may be primed initially from the low pressure accumulator, but otherwise will suck fluid from the master cylinder until the system is brought to full outlet pressure. Within the single pump unit 14, as cam bearing surface 28 strokes piston 24 from no lift to maximum lift (right-hand side of FIG. 1), ball valve 44 will be forced into engagement with the seat 42 by fluid pressure in pump chamber 38 plus spring force, and highly pressurized fluid will flow through intermediate passageway 96, unseating ball valve 114 and continuing through housing outlet passageway 100 to provide braking force to a wheel.

On the downstroke, maximum lift to no lift (left-hand side of FIG. 1), ball valve 114 will close under force of outlet check valve spring 116. Also, ball check valve 44 will be momentarily lifted from seat 42. Then, when at or nearly at the no lift point of crankshaft rotation, the force of spring 54 will be sufficient to return ball 44 to the seat 42. Then, the pump 10 may cycle again.

The valve arrangement of the present invention has numerous potential uses, but is particularly well-suited to vehicular fluid control systems including ABS/TA systems. Further, the method of installation described for the outlet check valve, could be used for both inlet and outlet check valves for a pump assembly having in-line inlet and outlet check valves, external to the main bore, and having an auxiliary bore extending from therebetween and into fluid flow communication with the pumping chamber.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A pump assembly for pumping fluid in a vehicular fluid control system, the pump assembly comprising:

a housing defining a main bore, an inlet bore, and an outlet bore, the inlet bore and the outlet bore being in fluid flow communication with the main bore, the outlet bore extending transverse of the main bore;

a reciprocatable piston retainable in the main bore;

an inlet check valve in fluid flow communication with the inlet bore and operable to pass fluid to the outlet bore when the piston reciprocates;

an outlet check valve located within the outlet bore and operable to pass fluid from the pump assembly when the piston reciprocates;

a sleeve retainable in the main bore, the sleeve having a sleeve bore, the piston being retainable in the sleeve bore, the piston including a drive section extending in part beyond an end of the sleeve and having a piston head for engaging a driving member, the piston further including a pump section at an opposite end of the drive section, and the piston having a fluid inlet passageway in fluid flow communication with the inlet bore and in fluid flow communication with a pumping chamber, the pumping chamber being enclosed by the sleeve and being in fluid flow communication with the outlet bore, the inlet check valve being disposed in the pumping chamber for controlling fluid flow between the fluid inlet passageway and the pumping chamber;

a first spring biasing the piston into engagement with the driving member for reciprocating the piston; and a second spring biasing the inlet check valve toward a closed position.

2. The pump assembly of claim 1 further comprising:

a plug element threadedly received in the main bore, the sleeve bore extending through the sleeve; and a spring seat received in the sleeve and abutting the first and second springs, the first and second springs biasing the spring seat into engagement with the plug element, whereby the plug element retains the piston and the sleeve within the main bore.

3. The pump assembly of claim 1 wherein the outlet check valve comprises:

an interference portion radially expanded into the housing beyond a boundary of the outlet bore thereby deforming the housing into locking engagement with the outlet check valve, retaining the outlet check valve within the outlet bore.

4. The pump assembly of claim 1 wherein the outlet check valve comprises:
   a valve body having a fluid outlet passageway therethrough for accommodating fluid flow; and
   a deformable flange extending sufficiently outwardly from the valve body for securing the outlet check valve within the outlet bore, whereby the flange is deformed into displacing engagement with the outlet bore to thereby secure the outlet check valve within the outlet bore.

5. The pump assembly of claim 4 wherein the outlet check valve further comprises:
   a valve seat located along the fluid outlet passageway;
   a spring retainer coupled to the valve body, the flange extending in part beyond an outermost portion of the spring retainer;
   a ball for controlling fluid flow through the fluid outlet passageway, the ball being located between the spring retainer and the valve seat; and
   a spring biasing the ball into engagement with the valve seat.

6. The pump assembly of claim 4 wherein the outlet bore defines a step, and the valve body includes a chamfered step seat at an end of the valve body, whereby the step seat is positioned into substantially supporting engagement with the step defined by the outlet bore to thereby support the outlet check valve during deformation of the flange.

7. The pump assembly of claim 4 wherein the valve body includes a flange support portion, the flange extending outwardly from the flange support portion, and the flange support portion having a flange support member extending outwardly therefrom, the flange and the flange support member defining an annular relief channel therebetween, whereby when the flange is deformed, the flange displaces into the annular relief channel and into displacing engagement with the outlet bore.

8. The pump assembly of claim 4 wherein the outlet bore defines a step, and the outlet check valve further comprises:
   a valve seat located along the fluid outlet passageway;
   a spring retainer coupled to the valve body, the flange extending in part beyond an outermost portion of the spring retainer;
   a ball for controlling fluid flow through the fluid outlet passageway, the ball being located between the spring retainer and the valve seat;
   a spring biasing the ball into engagement with the valve seat;
   a chamfered step seat at an end of the valve body for engaging the step defined by the outlet bore; and
   a flange support portion on the valve body, the flange extending outwardly from the flange support portion, and the flange support portion having a flange support member extending outwardly therefrom, the flange and the flange support member defining a gap volume therebetween, whereby the step seat is positioned into substantially supporting engagement with the step to thereby support the outlet check valve during deformation of the flange, and whereby the flange displaces into the gap volume and into displacing engagement with the outlet bore when the flange is deformed.

9. A vehicle braking system including an antilock braking system or a traction assist braking system, or both, operatively coupled therewith, the system including a pump assembly and a motor for driving the pump assembly, the motor having an output drive shaft having cam means for continuously engaging the pump assembly and driving the pump assembly on demand, the pump assembly comprising:
   a housing defining a main bore, an inlet bore, and an outlet bore, the inlet bore and the outlet bore being in fluid flow communication with the main bore, the outlet bore extending substantially perpendicularly to the main bore;
   a reciprocatable piston retainable in the main bore;
   an inlet check valve in fluid flow communication with the inlet bore and operable to pass fluid to the outlet bore when the piston reciprocates;
   an outlet check valve located within the outlet bore and operable to pass fluid from the pump assembly when the piston reciprocates;
   a sleeve retainable in the main bore, the sleeve having a sleeve bore, the piston being retainable in the sleeve bore, the piston including a drive section extending in part beyond an end of the sleeve and having a piston head for engaging a driving member, the piston further including a pump section at an opposite end of the drive section, and the piston having a fluid inlet passageway in fluid flow communication with the inlet bore and in fluid flow communication with a pumping chamber, the pumping chamber being enclosed by the sleeve and being in fluid flow communication with the outlet bore, and the pumping chamber and the fluid inlet passageway having a junction defining a valve seat, the inlet check valve being disposed in the pumping chamber for controlling fluid flow at the junction;
   a first spring biasing the piston into engagement with the driving member for reciprocating the piston; and
   a second spring biasing the inlet check valve toward a closed position, against the valve seat.

10. The vehicle braking system of claim 9 wherein the outlet check valve comprises:
    an interference portion radially expanded into the housing beyond a boundary of the outlet bore thereby deforming the housing into locking engagement with the outlet check valve, retaining the outlet check valve within the outlet bore.

11. The vehicle braking system of claim 9 wherein the outlet check valve comprises:
    a valve body having a fluid outlet passageway therethrough for accommodating fluid flow; and
    a deformable flange extending sufficiently outwardly from the valve body for securing the outlet check valve within the outlet bore, whereby the flange is deformed into displacing engagement with the outlet bore to thereby secure the outlet check valve within the outlet bore.

12. The vehicle braking system of claim 11 wherein the outlet bore defines a step, and the outlet check valve further comprises:
    a valve seat located along the fluid outlet passageway;
    a spring retainer coupled to the valve body, the flange extending in part beyond an outermost portion of the spring retainer;
    a ball for controlling fluid flow through the fluid outlet passageway, the ball being located between the spring retainer and the valve seat;
    a spring biasing the ball into engagement with the valve seat;
    a chamfered step seat at an end of the valve body for engaging the step defined by the outlet bore; and a flange support portion on the valve body, the flange extending outwardly from the flange support portion, and the flange support portion having a flange support member extending outwardly therefrom, the flange and the flange support member defining an annular relief channel therebetween, whereby the step seat is positioned into substantially supporting engagement with the step to thereby support the outlet check valve during deformation of the flange, and whereby the flange displaces into the annular relief channel and into displacing engagement with the outlet bore when the flange is deformed.

13. A valve for controlling fluid flow in a pump assembly for pumping fluid in a vehicular fluid control system, the pump assembly having a housing defining a bore, the valve comprising:

a valve body insertable into the bore and having a fluid passageway therethrough for accommodating fluid flow; and an interference portion operable to radially expand into a boundary of the bore, thereby deforming the housing into locking engagement with the bore and retaining the valve within the bore.

14. The valve of claim 13 wherein the interference portion is a deformable flange extending sufficiently outwardly from the valve body for securing the valve within the bore, the flange being adapted to displace the bore as the flange is deformed to thereby secure the valve within the bore.

15. The valve of claim 13 further comprising:

a valve seat located along the fluid passageway;

a spring retainer coupled to the valve body, the flange extending in part beyond an outermost portion of the spring retainer;

a ball for controlling fluid flow through the fluid passageway, the ball being located between the spring retainer and the valve seat; and a spring biasing the ball into engagement with the valve seat.

16. The valve of claim 13 wherein the bore defines a step, and the valve body includes a chamfered step seat at an end of the valve body, whereby the step seat is positionable into substantially supporting engagement with the step to thereby support the valve during deformation of the flange.

17. The valve of claim 13 wherein the valve body includes a flange support portion, the flange extending outwardly from the flange support portion, and the flange support portion having a flange support member extending outwardly therefrom, the flange and the flange support member defining an annular relief portion therebetween, whereby when the flange is deformed, the flange displaces into the annular relief portion and is adapted thereby to displace the bore as the flange is deformed.

18. The valve of claim 13 wherein the bore defines a step, the valve further comprising:

a valve seat located along the fluid passageway;

a spring retainer coupled to the valve body, the flange extending in part beyond an outermost portion of the spring retainer;

a ball for controlling fluid flow through the fluid passageway, the ball being located between the spring retainer and the valve seat;

a spring biasing the ball into engagement with the valve seat;

a chamfered step seat at an end of the valve body; and a flange support portion, the flange extending outwardly from the flange support portion, and the flange support portion having a flange support member extending outwardly therefrom, the flange and the flange support member defining an annular relief channel therebetween, whereby the step seat is positionable into substantially supporting engagement with the step to thereby support the valve during deformation of the flange, and whereby when the flange is deformed, the flange displaces into the annular relief channel and is adapted thereby to displace the bore as the flange is deformed.

19. A pump assembly for pumping fluid in a vehicular fluid control system, the pump assembly comprising:

a housing defining a main bore, an inlet bore, and an outlet bore, the inlet bore and the outlet bore being in fluid flow communication with the main bore, the outlet bore extending transverse of the main bore;

a reciprocatable piston retainable in the main bore;

an inlet check valve in fluid flow communication with the inlet bore and operable to pass fluid to the outlet bore when the piston reciprocates;

an outlet check valve in fluid flow communication with the outlet bore and operable to pass fluid from the pump assembly when the piston reciprocates;

a sleeve retainable in the main bore, the sleeve having a through-sleeve bore of constant diameter throughout its length, the piston being retainable in the sleeve bore, the piston including a drive section extending in part beyond one end of the sleeve and having a piston head for engaging a driving member, the piston further including a pump section at an opposite end of the drive section, and the piston having a fluid inlet passageway in fluid flow communication with the inlet bore and in fluid flow communication with a pumping chamber, the pumping chamber being enclosed by the sleeve and being in fluid flow communication with the outlet bore, the main bore including a shoulder, the sleeve being held in abutting engagement at the one end thereof with the main bore shoulder.

20. The pump assembly of claim 19, wherein the main bore includes a second shoulder, a cap member for closing the other end of the sleeve and defining a boundary of the pumping chamber, the cap member including a concentrically disposed compression sealing member in abutting engagement with the other end of the sleeve, the degree of compression of the sealing member being held constant by direct engagement of the cap member with the other end of the sleeve.

21. A method of securing a valve in a pump assembly for pumping fluid in a fluid control system, the pump assembly having a housing defining a bore, the bore defining a step therein, and the valve including a valve body, the method comprising the steps of:

inserting the valve body into the bore, the valve body having a deformable flange extending outwardly from the valve body, the flange being received in sliding engagement with the bore during insertion of the valve body;

positioning the valve into substantially supporting engagement with the step defined by the bore wherein the step engages an end of the valve body; and deforming the flange into displacing engagement with the bore by applying sufficient pressure to the flange to deform the flange into displacing engagement with the bore thereby securing the valve within the bore.

22. The method of claim 21 wherein the step of positioning the valve further comprises:

poisitioning a chamfered step seat located at an end of the valve body into substantially supporting engagement with the step defined by the bore.

23. The method of claim 21 wherein the bore defines a bore diameter, and the step of deforming the flange further comprises:

inserting a tool into the bore;

slidably engaging the tool with a spring retainer coupled to the valve body, the flange extending in part beyond an outermost portion of the spring retainer, the outermost portion having a retainer diameter less than the bore diameter, the tool slidably engaging the outermost portion and the bore there-between;

applying sufficient pressure to the flange with the tool; and removing the tool from the bore, whereby the valve remains secured in the bore.

24. The method of claim 21 wherein the step of deforming the flange further comprises:

deforming the flange into displacing engagement with the bore by applying sufficient pressure to the flange to displace the flange into an annular relief channel, the annular relief channel being defined by the flange and a flange support member therebetween prior to deformation of the flange, the flange and the flange support member extending outwardly from a flange support portion of the valve body.

25. The method of claim 24 wherein the step of deforming the flange further comprises:

applying sufficient pressure to the flange to displace the flange into substantially all of the annular relief channel, whereby the flange substantially engages the flange support member after displacement of the flange.

* * * * *